United States Patent [11] 3,578,306

| [72] | Inventor | Kenneth C. Smith<br>35 Harbord Drive, Bloomington, Ill. 61701 |
|---|---|---|
| [21] | Appl. No. | 830,704 |
| [22] | Filed | June 5, 1969 |
| [45] | Patented | May 11, 1971 |

[54] AIR PRESSURE OPERATED CLAMP
14 Claims, 6 Drawing Figs.

[52] U.S. Cl. ..................................... 269/24,
269/94, 269/22
[51] Int. Cl. ........................................ B23q 3/08
[50] Field of Search ........................ 269/20, 22,
24, 25, 27, 30, 31, 32, 33, 28, 91—94

[56] References Cited
UNITED STATES PATENTS

| 1,822,501 | 9/1931 | Onsrud | 269/32X |
| 2,908,205 | 10/1959 | Furman | 269/94X |
| 3,302,943 | 2/1967 | Meride | 269/94X |

*Primary Examiner*—William S. Lawson
*Assistant Examiner*—Donald D. Evenson
*Attorneys*—Clarence A. O'Brien and Harvey B. Jacobson

ABSTRACT: A workpiece is clamped to a supporting surface by slidable extension and pivotable displacement of a lever element relative to a mounting body. An air operated piston extends the lever element from the body against the bias of a retraction spring. When the piston reaches a limit position, the lever element is automatically pivoted under a larger clamping force transversely of the piston to clamp the workpiece at its outer engaging end.

Patented May 11, 1971

Kenneth C. Smith
INVENTOR.

BY Clarence A.O'Brien
and Harvey B. Jacobson
Attorneys

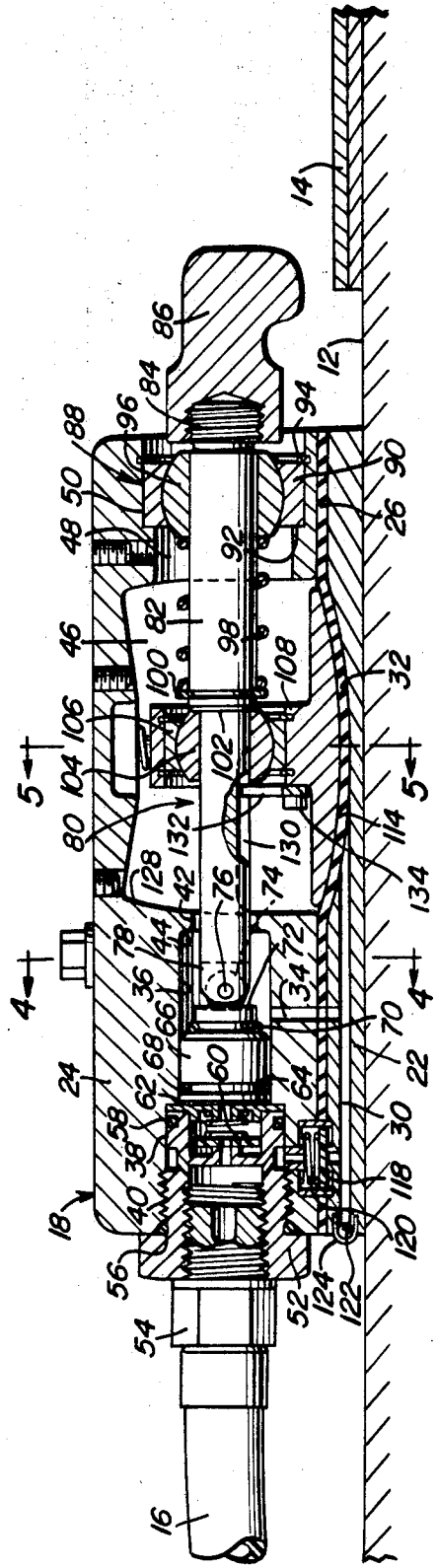
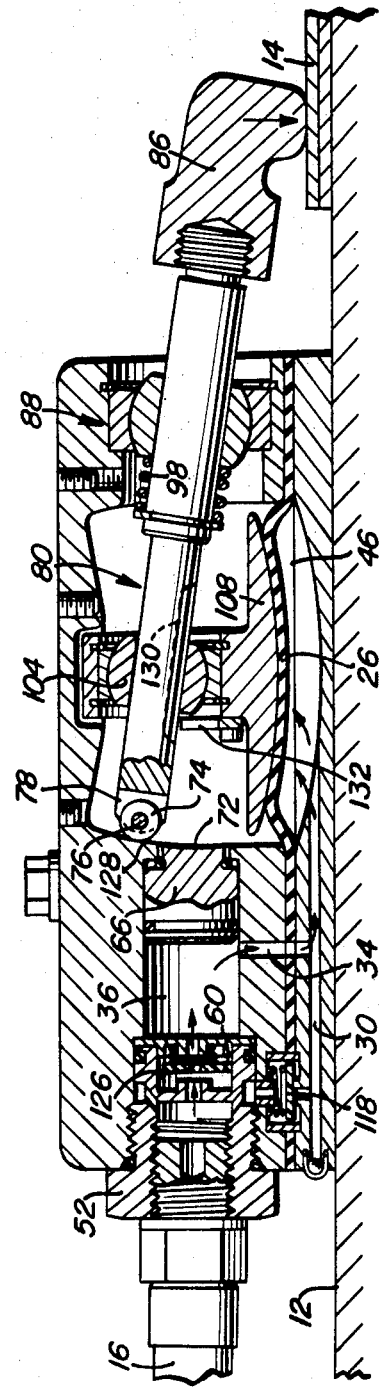
Kenneth C. Smith
INVENTOR.

3,578,306

AIR PRESSURE OPERATED CLAMP

This invention relates to holddown clamping devices and more particularly to a fluid power operated clamp device.

An important object of the present invention is to provide a fluid operated holddown clamp device having a relatively low profile. Further, the clamp device of the present invention despite its low profile and effective clamping ability, is completely enclosed and sealed except for the work-engaging element that is extended from the clamp body.

In accordance with the present invention, the clamp device includes a piston which is displaceable through a power stroke in a horizontal direction by air under pressure to a limit position. This piston has a relatively small pressure face to exert a relatively small force on a lever element sufficient to extend it from the clamp body through a front bearing assembly. The lever element is then automatically displaced transversely of the direction of piston travel by a second piston within another chamber having an arcuate guide surface along which the inner end portion of the lever element is guided for upward movement as the outer work-engaging end portion of the lever element engages the workpiece. The second piston has a relatively larger pressure face to exert a larger clamping force pivotally displacing the lever element when fluid under pressure is admitted to a diaphragm enclosed chamber through a port uncovered by the first-mentioned piston as it approaches its limit position. Upon release of pressure from the first piston chamber, return springs mounted on the second piston assembly pivotally return the lever element to its longitudinal position and a retraction spring then takes over to retract the lever element and displace the first-mentioned piston member through a return stroke.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a longitudinal sectional view through the clamp device taken substantially through a plane indicated by section line 2-2 in FIG. 1 showing the clamp device in a retracted position.

FIG. 3 is a longitudinal sectional view through the clamp device shown in an extended and clamping position.

Figure 1:
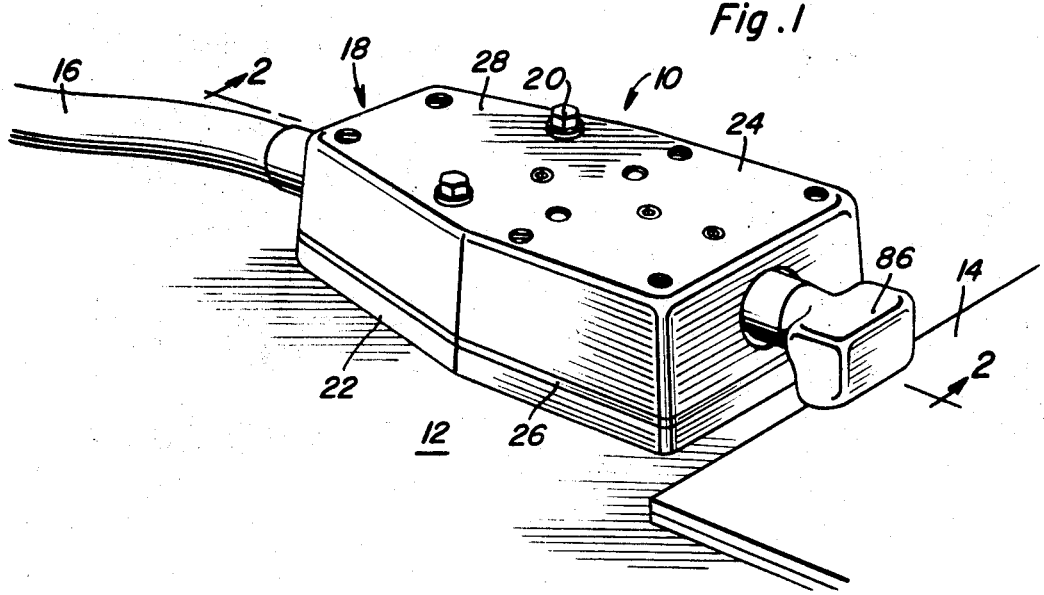
FIG. 1 is a perspective view showing the clamp device of the present invention in a typical installation.

Referring now to the drawings in detail, FIG. 1 illustrates the clamp device which is generally denoted by reference numeral 10. The clamp device is adapted to be secured to a horizontal surface 12 on which a workpiece such as plates 14 are supported and are to be clamped. In order to operate the clamp device, a source of air under pressure is supplied by a conduit 16 to a clamp body generally referred to by reference numeral 18 which is secured to the surface 12 by a pair of fastener assemblies 20.

Figure 4:
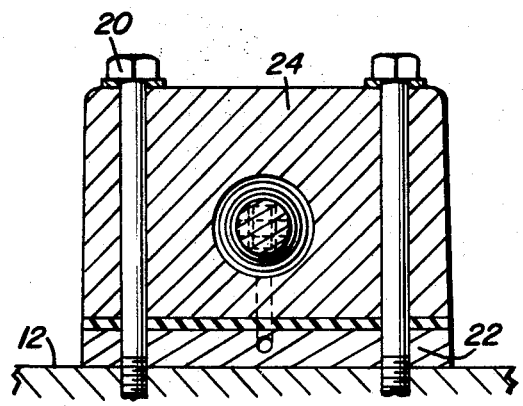
FIG. 4 is a transverse sectional view taken substantially through a plane indicated by section line 4-4 in FIG. 2.

The clamp body includes a base portion 22, and a housing portion 24 through which the fastener assemblies 20 extend into the supporting surface 12 as shown in FIG. 4. A flexible diaphragm element 26 is clamped between the base and housing portions of the clamp body which are held in assembled relation by means of a plurality of fastener assemblies 28. As more clearly seen in FIG. 2, the base portion 22 of the body is provided with an elongated, horizontal bore 30 that extends from the rear end of the clamp body to an arcuate depression 32 formed in the base portion between the forward and rear ends of the body. The flexible diaphragm element 26 normally lines the arcuate depression 32 as shown in FIG. 1.

A connecting bore passage 34 establishes fluid communication between the bore 30 and a substantially larger, cylindrical bore 36 formed in the upper housing portion 24 of the clamp body in parallel spaced relation to the bore 30. The cylindrical bore 36 forms a pressure chamber and is provided with a diametrically larger inlet portion 38 having an internally threaded section 40 at the rear end of the clamp body. At the forward end of the cylindrical bore 36, a smaller diameter section 42 is formed so as to establish a limit stop shoulder 44. The portion 42 of the cylindrical bore opens into an enlarged, intermediate chamber or cavity 46 formed within the portion 24 of the clamp body. Finally, a cylindrical bore 48 extends from the chamber 46 to the forward end of the clamp body in axial alignment with the cylindrical bore 36. The bore 48 includes a diametrically larger outlet end portion 50.

The inlet portion 38 of the cylindrical bore 36 threadedly receives a valve body 52 to which the air pressure conduit 16 is connected by means of the fitting 54. O-ring seals 56 and 58 seal the fluid chamber within the clamp body to which air under pressure is supplied through the valve body past a one-way flow restricting check valve 60 held in a closed position by a spring 62. The spring 62 is seated on a piston stop 64 which is held assembled by the valve body 52 against the shoulder between the large diameter inlet portion 38 of the cylindrical bore 36 and the pressure chamber within which piston member 66 is slidably mounted. O-ring seals 68 and 70 are mounted on the piston member which is also provided with a forward end face 72 engageable by a roller 74 rotatably mounted by a pin 76 at the inner engaging end portion 78 of lever element 80.

The lever element includes a large diameter portion 82 which extends forwardly to a threaded end portion 84 to which a work-engaging member 86 is threadedly connected outside of the clamp body. The large diameter portion 82 of the lever element slidably extends through a bearing assembly 88 having an outer race portion 90 held assembled between the shoulder 92 and an annular thrust washer 94 within the outlet bore portion 50 of the clamp body. A spherical bearing portion 96 is pivotally movable within the outer race portion 90 about a pivot axis fixed in the clamp body and slidably receives the large diameter portion 82 of the lever element.

Figure 5:
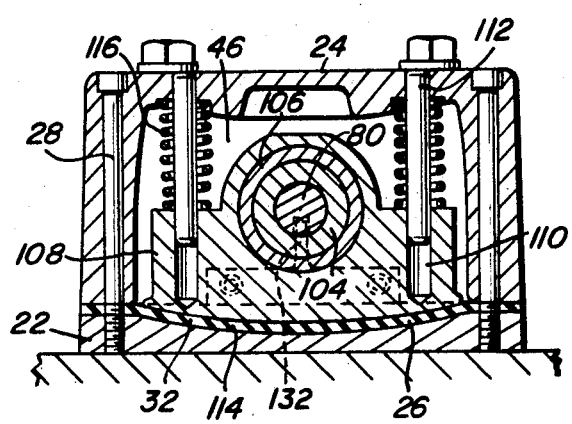
FIG. 5 is a transverse sectional view taken substantially through a plane indicated by section line 5-5 in FIG. 2.
Figure 6:
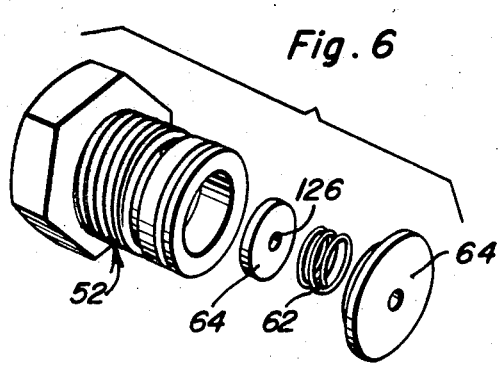
FIG. 6 is a perspective view of some of the disassembled parts associated with the clamp device.

A retraction spring 98 is mounted on the portion 82 of the lever element and reacts between the bearing portion 96 and the annular thrust washer 100 seated in a groove formed adjacent to the shoulder 102 on the lever element with which another spherical bearing element 104 abuts. The spherical bearing element 104 is received in a cylindrical bearing race 106 movably carried by a transversely displaceable piston 108. As shown in FIGS. 2 and 5, the clamp piston includes a pair of bores 110 spaced on opposite lateral sides of the pivot bearing and receives guide pins 112 fixed to the housing portion 24 of the clamp body within the intermediate chamber 46. The lower pressure face 114 of the piston 108 is arcuate in shape so as to normally clamp the flexible diaphragm element 26 to the arcuate surface 32 of the base portion 22 under the bias of return springs 116 seated on the guide pins 112 between the housing portion 24 and the piston 108. Further, the pressure face 114 is substantially larger in area than the pressure face 73 of piston member 66 so as to exert a relatively large clamping force on the lever element. Since the larger pressure face 114 extends in a generally horizontal direction, the low profile of the clamp device will not be disturbed.

Referring now to FIG. 2, it will be noted that a check valve 118 normally blocks fluid communication between the valve body 52 and the fluid passage of bore 30 under the bias of a spring 120. Since fluid under pressure is to be conducted through the bore 30 to the diaphragm element 26, the bore is closed at the rear end of the clamp body by a ball bearing 122 held in place by a retainer 124. Should the pressure within the bore 30 exceed the pressure within the valve body 52, the check valve 118 will open. If the pressure within bore 30 becomes excessive, it will blow out the ball bearing 122 and its retainer 124 to prevent damage to the parts of the clamp device.

In order to operate the clamp device, air under pressure from a suitable source (not shown) is admitted to the rear end of the clamp body by the conduit 16 under control of a valve (not shown) which may alternatively vent the conduit to atmosphere. Thus, the pressurized air enters the valve body 52 opening check valve 60 as shown in FIG. 3, to promptly displace the piston member 66 toward its limit position under a force determined by the relatively small area of the pressure face 73 sufficient to overcome the bias of spring 98. As the piston member 66 moves forwardly, it slidably displaces the lever element along the longitudinal axis of the clamp body generally parallel to the supporting surface 12. As the piston member approaches its limit position as shown in FIG. 3, the connecting passage or port 34 is uncovered at the pressure face 73 of the piston member so that air under pressure is conducted through bore 30 to the flexible diaphragm element 26 within the intermediate chamber 46. The piston 108 is thereby displaced transversely of the longitudinal axis of the clamp body and through the pivotal bearing element 104 carried thereby, it pivotally displaces the lever element 80 about the fixed pivot axis established by the bearing assembly 88 at the front end of the clamp body. The inner end portion 78 of the lever element is guided by movement along the arcuate guide surface 128 of the intermediate chamber 46 relieving the load on piston member 66 and preventing retraction under the bias of spring 98. The work-engaging member 86 on the lever element is thereby effective to clamp and hold down the workpiece 14.

Upon release of the air pressure or venting of conduit 16, the return springs 116 downwardly displace the piston 108 forcing the air in intermediate chamber 46 back through the bore 30 and through the check valve 118 to be vented from the valve body 52 through the conduit 16. Once the lever element is pivotally returned to its longitudinal position, it is then retracted by the spring 98 from its extended position forcing the piston member 66 rearwardly. The outflow of air trapped within the bore 36 through opening 126 in the closed check valve 60 retards movement of the piston member and the lever element in the return stroke direction. The valve body 52 and the bearing assembly 88 seal the cavities within the clamp body which thereby protectively encloses all of the moving parts of the clamp device except for the portion of the lever element extended therefrom. In order to prevent angular displacement of the lever element about its longitudinal axis during forward and return movement, a keyway 130 is formed therein to slidingly receive a key 132 secured by fastener 134 to the piston 108.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A power operated clamp device adapted to hold a workpiece on a supporting surface, comprising an elongated body secured to the supporting surface in spaced relation to the workpiece, said body having a longitudinal bore extending therethrough along a longitudinal axis generally parallel to said supporting surface and an intermediate chamber intersecting the bore, an elongated lever element extending from the bore outwardly of the body toward the workpiece having opposite end portions, bearing means pivotally and slidably mounting the lever element within the bore on one side of the intermediate chamber, piston means engageable with one of the end portions of the lever element in a retracted position within the bore on the other side of the intermediate chamber for slidably displacing the lever element along said axis to an extended position and fluid operated means operatively connected to the lever element within the intermediate chamber for pivotal displacement of the lever element to a clamping position in response to said slidable displacement of the lever element to the extended position.

2. The combination of claim 1 wherein said one of the end portions of the lever element in the clamping position is displaced from the bore transversely of the longitudinal axis.

3. The combination of claim 2 wherein the bore in the body is sealed by the bearing means and the piston means.

4. The combination of claim 3 wherein said fluid operated means comprises a piston element pivotally and slidably connected to the lever element and having a pressure face, a flexible diaphragm mounted by the body on which the pressure face of the piston element is seated within the intermediate chamber, and passage means conducting fluid under pressure from the bore to the diaphragm within the intermediate chamber in response to movement of the piston means to a limit position.

5. The combination of claim 4 wherein said piston means includes a slidable member having an end face engageable with said lever element and a pressure responsive face substantially smaller in area than the pressure face of the piston element, the slidable member opening the passage means in the limit position of the piston means.

6. The combination of claim 5 including retraction spring means continuously biasing the lever element to the retracted position and means for preventing retraction of the lever element while being pivotally displaced to the clamping position.

7. The combination of claim 1 wherein the bore in the body is sealed by the bearing means and the piston means.

8. The combination of claim 1 wherein said fluid operated means comprises a piston element pivotally and slidably connected to the lever element and having a pressure face, and passage means conducting fluid under pressure from the bore to the intermediate chamber in response to movement of the piston means to limit position.

9. The combination of claim 8 wherein said piston means includes a slidable member having an end face engageable with said lever element and a pressure responsive face substantially smaller in area than that of the pressure face of the piston element.

10. The combination of claim 1 including retraction spring means continuously biasing the lever element to the retracted position and means for preventing retraction of the lever element while being pivotally displaced to the clamping position.

11. A power operated clamp device adapted to hold a workpiece on a supporting surface, comprising a lever element having an inner end portion, a body, bearing means pivotally mounting the lever element about a pivot axis fixed to the body, fluid operated piston means engageable with the lever element for slidable displacement thereof relative to the bearing means, retraction means biasing the lever element into engagement with the piston means, means for limiting displacement of the piston means to a limit position within the body against the bias of the retraction means, and means responsive to displacement of the piston means to said limit position for pivoting the lever element about said pivot axis out of engagement with the piston means.

12. The combination of claim 11 wherein said body is provided with a cavity accommodating said pivoting of the lever element, said cavity having a guide surface engaged by the inner end portion of the lever element to prevent retraction of the lever element while being pivoted about the pivot axis.

13. The combination of claim 12 wherein said means for pivoting the lever element includes means for exerting a substantially larger force on the lever element than that exerted by the piston means in a direction transverse to movement of the piston means.

14. The combination of claim 11 wherein said means for pivoting the lever element includes means for exerting a substantially larger force on the lever element than that exerted by the piston means in a direction transverse to movement of the piston means.